United States Patent
Jung et al.

(10) Patent No.: US 11,014,439 B2
(45) Date of Patent: May 25, 2021

(54) BRAKING APPARATUS AND BRAKING CONTROL METHOD FOR VEHICLE

(71) Applicant: HYUNDAI MOBIS CO., LTD., Seoul (KR)

(72) Inventors: Jae Hoon Jung, Yongin-si (KR); Soung Jun Park, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 42 days.

(21) Appl. No.: 16/351,528

(22) Filed: Mar. 13, 2019

(65) Prior Publication Data

US 2019/0299768 A1 Oct. 3, 2019

(30) Foreign Application Priority Data

Mar. 29, 2018 (KR) .......... 10-2018-0036585

(51) Int. Cl.
| | |
|---|---|
| *B60T 13/58* | (2006.01) |
| *B60K 6/52* | (2007.10) |
| *B60K 6/445* | (2007.10) |
| *B60L 50/16* | (2019.01) |

(Continued)

(52) U.S. Cl.
CPC ............... *B60K 6/52* (2013.01); *B60K 6/445* (2013.01); *B60L 3/108* (2013.01); *B60L 7/10* (2013.01); *B60L 50/16* (2019.02)

(58) Field of Classification Search
CPC .......... B60K 6/52; B60K 6/445; B60L 50/16; B60L 3/108; B60L 7/10; B60L 7/26; B60L 7/18; B60T 2270/604; B60T 13/586
See application file for complete search history.

(56) References Cited

U.S. PATENT DOCUMENTS

| | | | |
|---|---|---|---|
| 9,333,957 B2* | 5/2016 | Ross ................ | B60T 8/4872 |
| 9,925,965 B2* | 3/2018 | Spoeri .............. | B60L 1/003 |
| 10,189,454 B2* | 1/2019 | Yamamoto ........ | B60T 13/586 |

(Continued)

FOREIGN PATENT DOCUMENTS

| | | |
|---|---|---|
| JP | 7-336805 | 12/1995 |
| KR | 10-2008-0024651 | 3/2008 |

(Continued)

OTHER PUBLICATIONS

Korean Office Action dated Jul. 23, 2020, in Korean Patent Application 10-2018-0036585 (Global Dossier translation).

*Primary Examiner* — Thomas W Irvin
(74) *Attorney, Agent, or Firm* — H.C. Park & Associates, PLC

(57) ABSTRACT

A braking apparatus and a braking control method for a vehicle, wherein the braking apparatus includes an inlet valve for interrupting a braking hydraulic pressure supplied to a wheel cylinder of the vehicle, a regenerative braking unit for performing the regenerative braking of the vehicle, and a control unit for controlling the braking hydraulic pressure supplied to the wheel cylinder by controlling the inlet valve so that hydraulic braking force determined by subtracting a hydraulic braking force generated by the regenerative braking unit from a demand braking force requested by a driver is generated. The control unit controls the hydraulic braking pressure supplied to the wheel cylinder by controlling the inlet valve on the basis of changes in the vehicle speed and the regenerative braking force of the vehicle.

14 Claims, 9 Drawing Sheets

(51) Int. Cl.
  *B60L 7/10*     (2006.01)
  *B60L 3/10*     (2006.01)

(56) References Cited

U.S. PATENT DOCUMENTS

| | | | | |
|---|---|---|---|---|
| 2015/0353064 | A1* | 12/2015 | Spoeri | B60T 8/4086 |
| | | | | 303/3 |
| 2017/0232849 | A1* | 8/2017 | Yamamoto | B60T 8/172 |
| | | | | 303/15 |
| 2017/0240154 | A1* | 8/2017 | Kashiwai | B60T 13/146 |
| 2018/0079313 | A1* | 3/2018 | Foitzik | B60T 13/741 |
| 2020/0148208 | A1* | 5/2020 | Choi | B60W 10/182 |

FOREIGN PATENT DOCUMENTS

| | | |
|---|---|---|
| KR | 10-2015-0117898 | 10/2015 |
| KR | 10-2017-0129839 | 11/2017 |

* cited by examiner

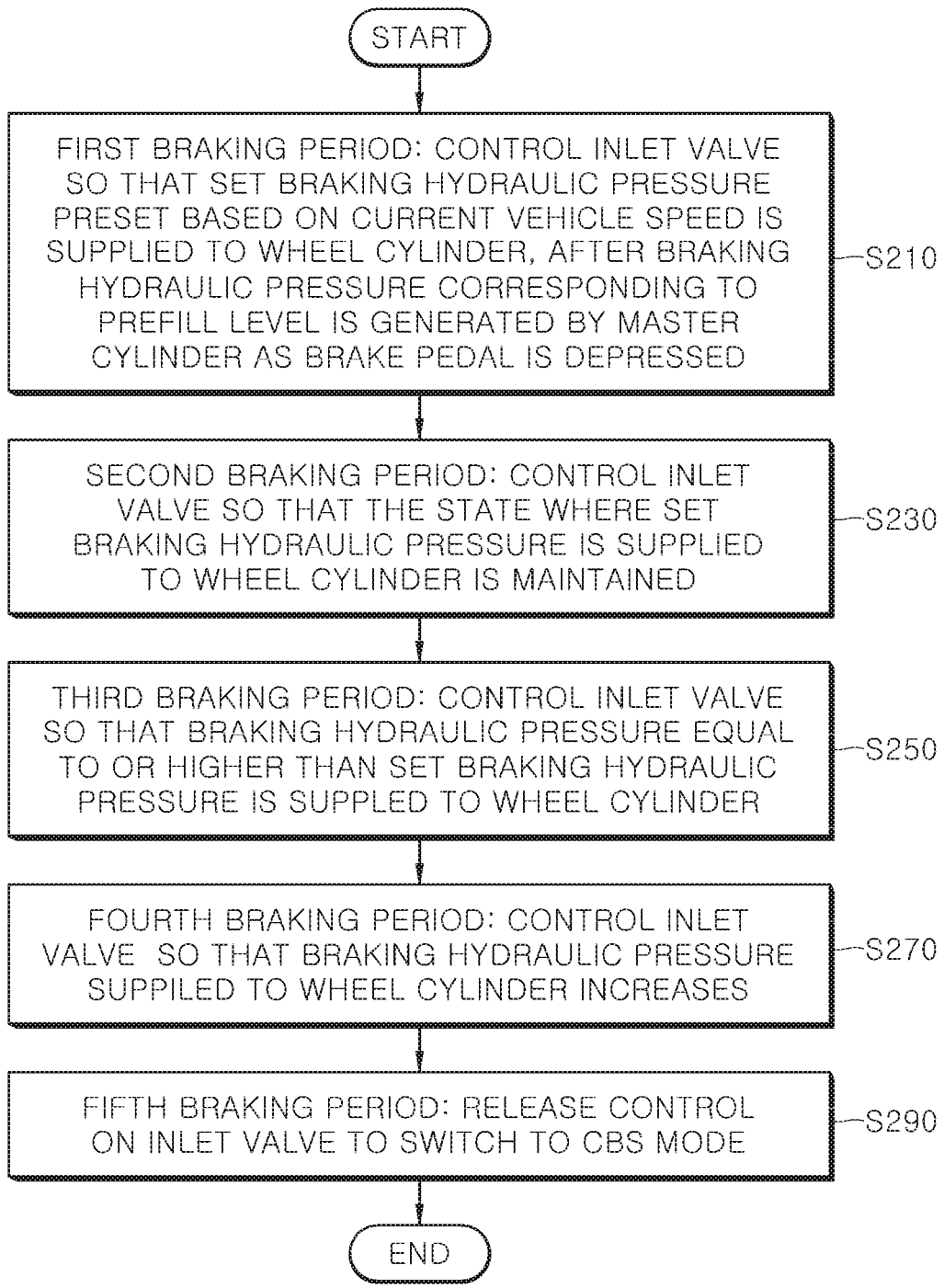

BRAKING APPARATUS AND BRAKING CONTROL METHOD FOR VEHICLE

CROSS-REFERENCE TO RELATED APPLICATION

This application claims priority from and the benefit of Korean Patent Application No. 10-2018-0036585, filed on Mar. 29, 2018, which is herein incorporated by reference for all purposes as if set forth herein.

BACKGROUND

Field

Exemplary embodiments relate to a braking apparatus and a braking control method for a vehicle, and more particularly, relates to a braking apparatus for a vehicle, which performs friction braking by hydraulic pressure in connection with the regenerative braking of a vehicle and a braking control method for the vehicle.

Discussion of the Background

Conventionally, the engine-driven vehicle has been equipped with numerous components such as an engine, a transmission, a drive shaft and a hydraulic brake as well as other engine related fuel supplying devices, intake and exhaust devices, cooling and lubrication devices, and dust-proof devices, thereby causing a problem of polluting the atmosphere by the exhaust gas.

In order to solve such problems, a vehicle equipped with an electric motor, a hydrogen vehicle, a next-generation vehicle using a fuel cell or solar energy and the like have been developed. Recently, a regenerative braking system for improving fuel economy has been adopted as a braking system for a vehicle equipped with an electric motor. The regenerative braking is a method of braking a vehicle by absorbing the inertial force of a vehicle to be advanced at the time of braking of the vehicle with an electric motor, and an energy corresponding to a back electromotive force generated in the electric motor is stored in a battery.

The braking force applied to a wheel in a hybrid vehicle to which the hydraulic braking is applied together with the regenerative braking is the sum of the regenerative braking force by an electric motor and the hydraulic braking force by a hydraulic device. When the hybrid vehicle performs the hydraulic braking, there is a need to perform the braking of the vehicle by effectively linking with the regenerative braking while maintaining the durability of a hydraulic pump that is typically included in the hydraulic devices and a hydraulic motor for operating the hydraulic pump.

The related art of the present disclosure is disclosed in Korean Patent Publication No. 10-2008-0024651 published on Mar. 19, 2008 and entitled "The Control Method of Hydraulic Brake for Hybrid Electric Vehicle".

The above information disclosed in this Background section is only for enhancement of understanding of the background of the invention and, therefore, it may contain information that does not constitute prior art.

SUMMARY

Exemplary embodiments of the present invention has been proposed to solve the above problems and an aspect of the present invention provides a braking apparatus capable of performing hydraulic braking through only a predetermined control logic without the mechanical design change of the hydraulic device equipped in the vehicle or addition of new components, so that the braking of the vehicle can be performed effectively in conjunction with the regenerative braking while maintaining the durability of the hydraulic device, and a braking control method therefor.

A braking apparatus for a vehicle according to an aspect of the present invention may include: an inlet valve for interrupting a braking hydraulic pressure supplied to a wheel cylinder of the vehicle, a regenerative braking unit for performing the regenerative braking of the vehicle, and a controller for controlling the braking hydraulic pressure supplied to the wheel cylinder by controlling the inlet valve to generate a hydraulic braking force determined by subtracting a hydraulic braking force generated by the regenerative braking unit from a demand braking force requested by a driver, wherein the controller controls the braking hydraulic pressure supplied to the wheel cylinder by controlling the inlet valve based on the changes of the vehicle speed of the vehicle and a regenerative braking force.

The controller may control the braking hydraulic pressure supplied to the wheel cylinder by differentially controlling the inlet valve for each of at least one braking interval determined based on the vehicle speed and the regenerative braking force.

In a first braking period in which the regenerative braking force is generated as a brake pedal is depressed in a driving state of the vehicle and the brake of the vehicle starts, the controller may control the inlet valve so that a set braking hydraulic pressure preset based on the current vehicle speed of the vehicle is supplied to the wheel cylinder, after the braking hydraulic pressure corresponding to a prefill level is generated by a master cylinder as the brake pedal is depressed.

After the first braking period, in a second braking period in which the vehicle starts to decelerate and the regenerative braking force increases as the demand braking force increases, the controller may control the inlet valve so that the state in which the set braking hydraulic pressure is supplied to the wheel cylinder is maintained.

In a third braking period which starts from the time when the brake pedal is further depressed compared to the first braking period in a state where the second braking period is maintained, the controller may control the inlet valve so that the braking hydraulic pressure equal to or higher than the set braking hydraulic pressure is supplied to the wheel cylinder.

After the third braking period, in a fourth braking period in which the deceleration state of the vehicle is maintained and the regenerative braking force decreases, the controller may control the inlet valve so that the braking hydraulic pressure supplied to the wheel cylinder is increased.

The inlet valve may be a normal open type solenoid valve, and the controller may control the braking hydraulic pressure supplied to the wheel cylinder by controlling a driving current applied to the normal open type solenoid valve.

A braking control method for a vehicle according to an aspect of the present invention may include: controlling a braking hydraulic pressure supplied to a wheel cylinder by controlling an inlet valve to generate a hydraulic braking force determined by subtracting a hydraulic braking force generated by a regenerative braking unit from a demand braking force requested by a driver, by a controller, wherein the controller controls the hydraulic braking pressure supplied to the wheel cylinder by controlling the inlet valve based on the changes of the vehicle speed of the vehicle and a regenerative braking force.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principle of the invention.

FIG. 9 is a flowchart for specifically explaining a step of adjusting a braking hydraulic pressure in a braking control method of a vehicle according to an embodiment of the present disclosure.

DETAILED DESCRIPTION OF THE ILLUSTRATED EMBODIMENTS

Figure 1:
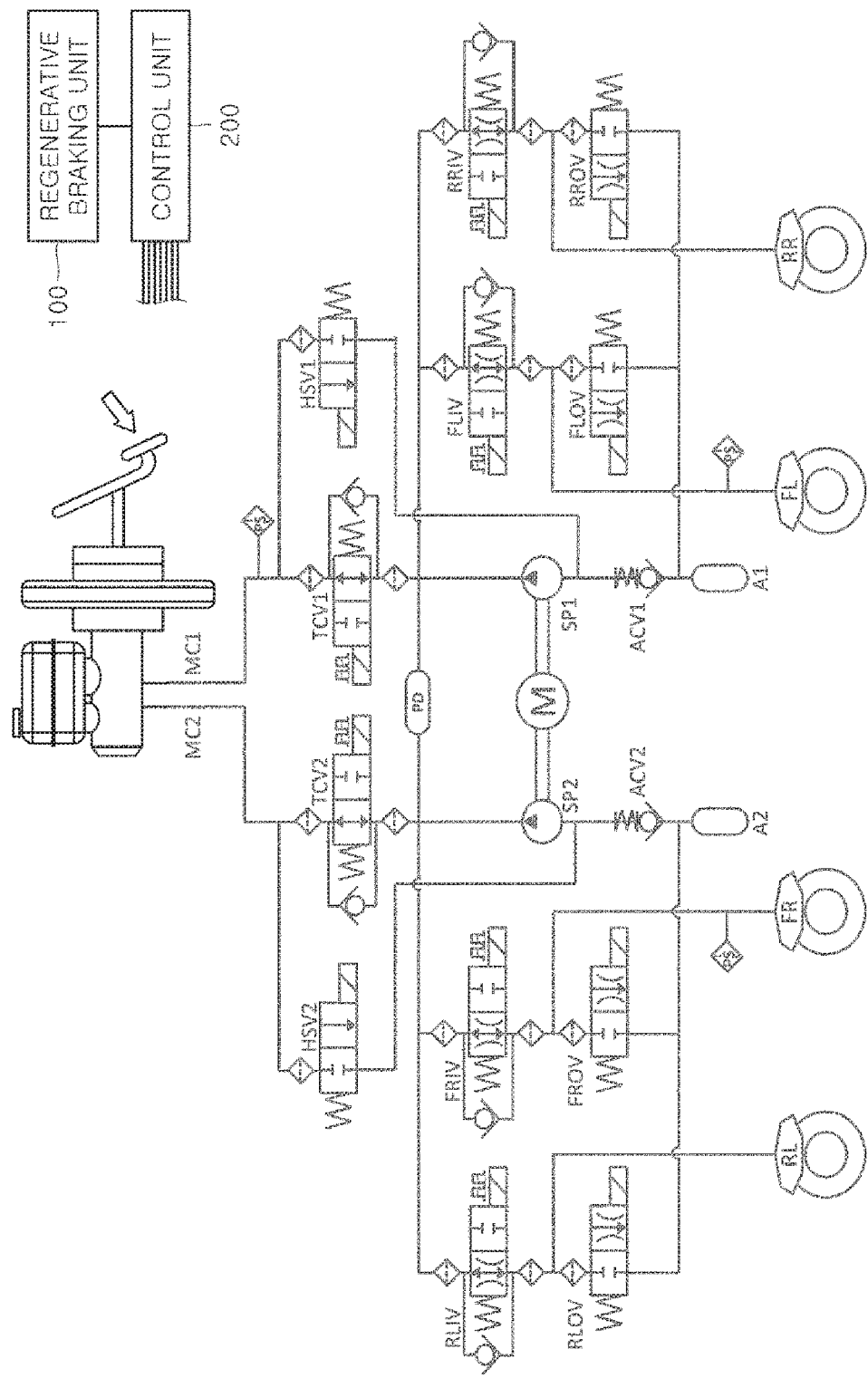
FIG. 1 is an exemplary view for explaining a structure of a braking apparatus for a vehicle according to an embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Hereinafter, a braking apparatus for a vehicle and a braking control method therefor in accordance with exemplary embodiments of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 2:
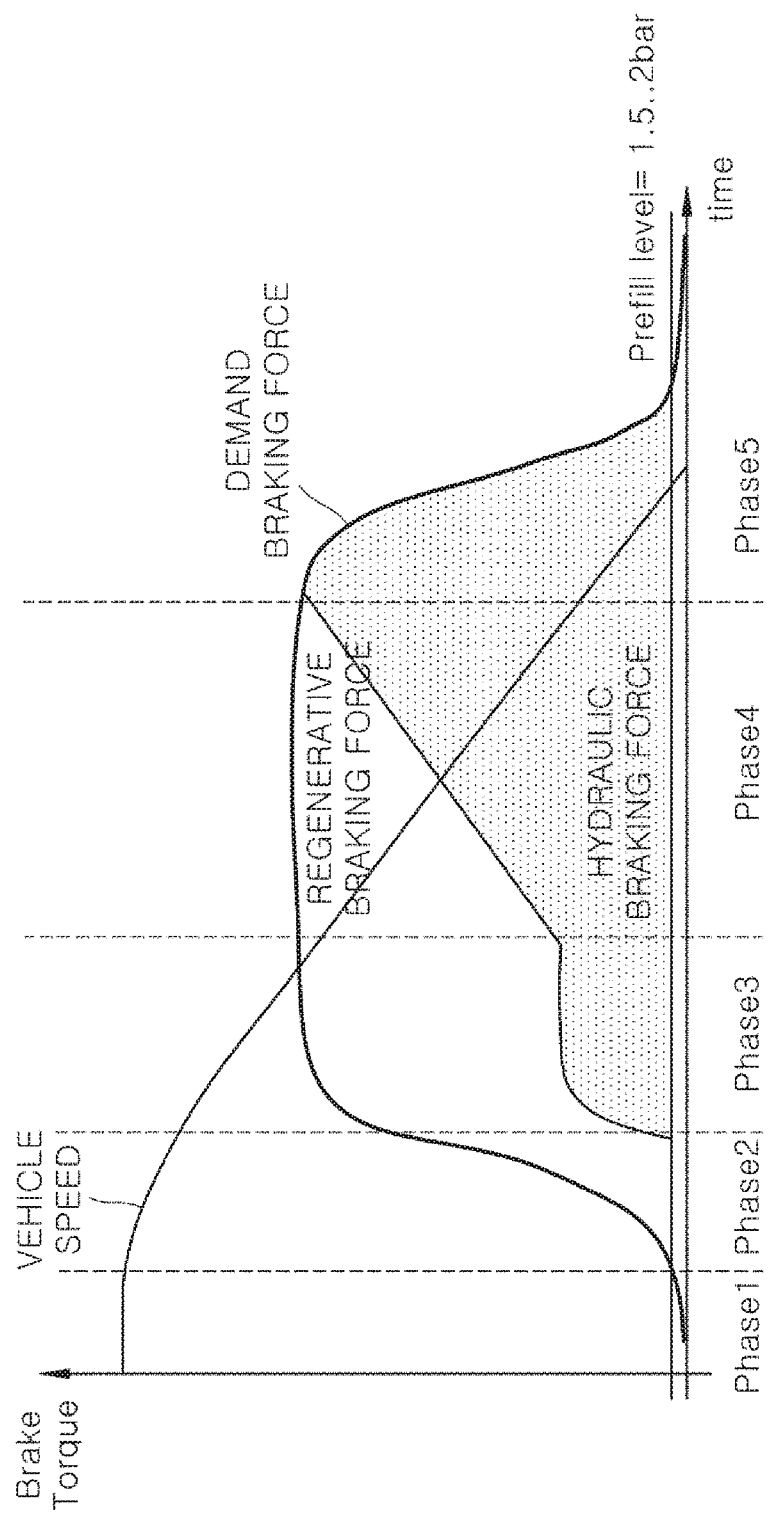
FIG. 2 is an exemplary view for explaining first to fifth braking periods in a braking apparatus for a vehicle according to an embodiment of the present invention.

FIG. 1 is an exemplary view for explaining the structure of a braking apparatus for a vehicle according to an embodiment of the present invention, FIG. 2 is an exemplary view for explaining first to fifth braking periods in the braking apparatus for a vehicle according to an embodiment of the present invention, and FIGS. 3 to 7 are exemplary views illustrating the flow of a braking hydraulic pressure in the first to fifth braking periods in the braking apparatus for a vehicle according to an embodiment of the present invention.

First, the structure of the braking apparatus for a vehicle according to an embodiment of the present invention will be described with reference to FIG. 1.

When a driver presses a brake pedal, a control unit 200, which will be described later, may sense the driver's braking request through a pedal travel sensor (PTS: not shown), and a braking hydraulic pressure may be generated in master cylinders MC1 and MC2 under the control of the control unit 200 which senses the driver's braking request. More specifically, an actuator motor (not shown) may be driven by the control of the control unit 200 to move a ball screw (not shown) forward or backward, and the braking hydraulic pressure may be generated by the master cylinders MC1 and MC2 which are pressurized or released by the forward or backward ball skew.

Valves for interrupting the braking hydraulic pressure may be provided on flow paths for supplying the braking hydraulic pressure generated by the master cylinders MC1 and MC2 to wheel cylinders FL, FR, RL and RR. More specifically, traction control valves TCV1 and TCV2 for interrupting the braking hydraulic pressure generated by the master cylinders MC1 and MC2 may be provided at the outlet sides of the master cylinders MC1 and MC2, and inlet vales FLIV, FRIV, RLIV and RRIV for interrupting the braking hydraulic pressure supplied to the wheel cylinders FL, FR, RL and RR may be provided on the flow path between the traction control valves TCV1 and TCV2 and the wheel cylinders FL, FR, RL and RR. In addition, outlet valves FLOV, FROV, RLOV and RROV for releasing the braking hydraulic pressure formed in the wheel cylinders FL, FR, RL and RR may be provided at the outlet sides of the wheel cylinders FL, FR, RL and RR, and accumulators A1 and A2 for storing brake oil discharged from the wheel cylinders FL, FR, RL and RR may be provided at the outlet sides of the outlet valves FLOV, FROV, RLOV and RROV. Hydraulic pumps SP1 and SP2 for pumping the brake oil stored in the accumulators A1 and A2 to supply it to the wheel cylinders FL, FR, RL and RR and a hydraulic motor M for driving the hydraulic pumps SP1 and SP2 may be provided, and check valves ACV1 and ACV2 may be provided on the flow path between the hydraulic pumps SP1 and SP2 and the accumulators A1 and A2. Further, high pressure switch valves HSV1 and HSV2 may be provided on the flow path between the inlet sides of the hydraulic pumps SP1 and SP2 and the master cylinders MC1 and MC2.

The above described traction control valves TCV1 and TCV2 and the inlet valves FLIV, FRIV, RLIV and RRIV may be normal open type solenoid valves, and the high-pressure switch valves HSV1 and HSV2 and the outlet valves FLOV, FROV, RLOV and RROV may be normal close type solenoid valves. The control unit 200 can perform pulse width modulation (PWM) duty control of each of the valves by applying a drive current to each of the valves.

Hereinafter, the wheel cylinder WC will be described to include at least one of a wheel cylinder FL on the left side of the front wheel, a wheel cylinder FR on the right wheel side of the front wheel, a wheel cylinder RL on the left wheel side of the rear wheel and a wheel cylinder RR on the right side of the rear wheel. In addition, the inlet valve IV will be described to include at least one of an inlet valve FLIV on the left side of the front wheel, an inlet valve FRIV on the right side of the front wheel, an inlet valve RLIV on the left side of the rear wheel and an inlet valve RRIV on the right side of the rear wheel. For example, the inlet valve IV controlled in the first to fifth braking periods to be described later may mean the inlet valves FLIV and FRIV of the front wheel, the inlet valves RLIV and RRIV of the rear wheels, or the inlet valves FLIV, FRIV, RLIV and RRIV of the front and rear wheels. In addition, the present embodiment can be applied to both of an X-Split type braking system or an H-Split type braking system.

The regenerative braking unit 100 may perform the regenerative braking of a vehicle. More specifically, the regenerative braking unit 100 may include a battery (not shown) for supplying electric power to an electric motor when the vehicle travels and storing energy corresponding to the back electromotive force generated in the electric motor at the time of the regenerative braking, the electric motor (not shown) that absorbs the inertial force of the vehicle to be advanced to perform regenerative braking at the time of braking the vehicle, and a hybrid control unit (HCU, not shown) for calculating possible regenerative braking torque to control the electric motor to perform regenerative braking.

The control unit 200 may be implemented as a brake electronic control unit (ECU) and control the inlet valve IV so that the hydraulic braking force (i.e., the hydraulic braking torque) determined by subtracting the regenerative braking force generated by the regenerative braking unit 100 (i.e., the regenerated braking torque calculated a hybrid control unit) from the demanded braking force requested by the driver (i.e., the demand braking torque) is generated to control the braking hydraulic force supplied to the wheel cylinder WC.

The control unit 200 may sense a driver's braking request through a pedal travel sensor (PTS) to determine a demand braking force requested by the driver and may subtract the regenerative braking force transmitted from the regenerative braking unit 100 from the determined demand braking force to determine the hydraulic braking force to be applied to the wheel cylinder WC. Also, the control unit 200 may control the inlet valve IV so that the determined hydraulic braking force is applied to the wheel cylinder WC, thereby adjusting the braking hydraulic pressure supplied to the wheel cylinder WC. In particular, in this embodiment, the control unit 200 may control the braking hydraulic pressure supplied to the wheel cylinder WC by adjusting the driving current applied to the inlet valve IV, which is a normal open type solenoid valve.

At this time, the control unit 200 may control the braking hydraulic pressure supplied to the wheel cylinder WC by controlling the inlet valve IV based on the change of the vehicle speed of the vehicle and the regenerative braking force. More specifically, the control unit 200 may control the braking hydraulic pressure supplied to the wheel cylinder WC by differently controlling the inlet valve IV for each of at least one braking period determined based on the vehicle speed and regenerative braking force.

The braking periods described above will be described in detail with reference to FIG. 2. The braking period may be divided into first to fifth braking periods based on the vehicle speed and the regenerative braking force.

The first braking period may mean a period in which the regenerative braking force is generated as the brake pedal is depressed by the driver in the driving state of the vehicle and the braking of the vehicle is started. The second braking period may mean a period in which the vehicle starts to decelerate after the first braking period and the regenerative braking force increases as the demand braking force increases. The third braking period may mean a period that enters from the time when the brake pedal is further depressed compared to the first braking period in the state where the second braking period is maintained. The fourth braking period may mean a period in which the deceleration state of the vehicle is maintained, and the regenerative braking force decreases after the third braking period. And, the fifth braking period may include a time point at which the vehicle is stopped due to the deceleration of the vehicle and the brake pedal is released from the depression and may mean a period in which the regenerative braking is terminated.

Hereinafter, a process of controlling the inlet valve IV by the control unit 200 in each braking period will be described in detail with reference to FIGS. 3 to 7.

Figure 3:
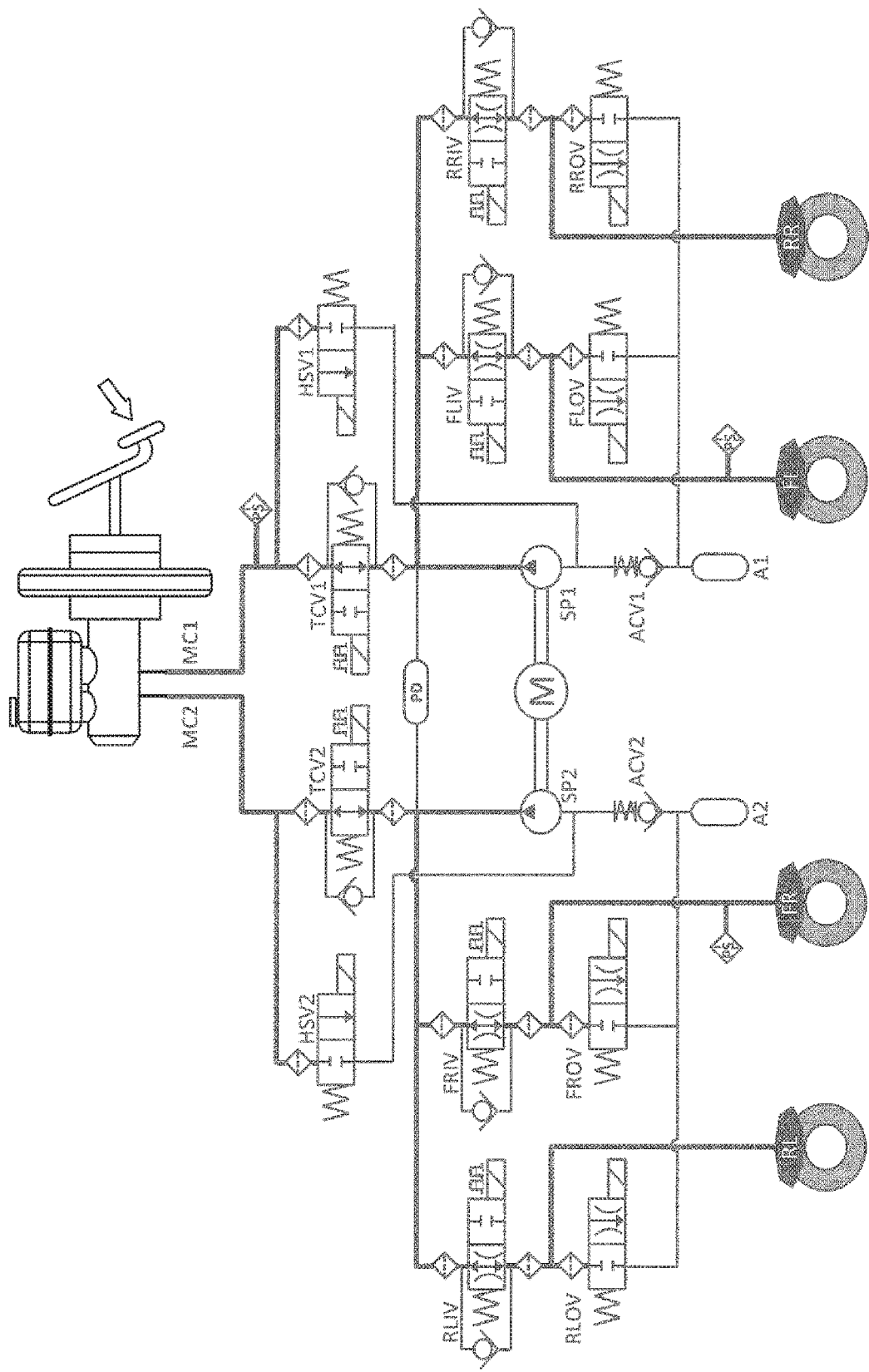
FIG. 3, FIG. 4, FIG. 5, FIG. 6, and FIG. 7 are exemplary views illustrating the flow of a braking hydraulic pressure in the first to fifth braking periods in the braking apparatus for a vehicle of the present invention.

In the first braking period in which the regenerative braking force is generated as the brake pedal is depressed in the driving state of the vehicle and the braking of the vehicle is started, after the braking hydraulic pressure corresponding to a prefill level is generated by the master cylinders MC1 and MC2 as the brake pedal is depressed, the control unit 200 may control the inlet valve IV so that the set braking hydraulic pressure that is preset based on the current vehicle speed of the vehicle is supplied to the wheel cylinder WC, as shown in FIG. 3.

More specifically, in the first braking period, the control unit 200 may determine whether the braking hydraulic pressure corresponding to the prefill level has been generated by the master cylinders MC1 and MC2 and may determine whether the braking hydraulic pressure corresponding to the prefill level has been generated through a predetermined pressure sensor PS provided at the outlet sides of the master cylinders MC1 and MC2. The prefill level may be variously designed on the basis of the specifications of the braking system, the designer's intention and the set braking hydraulic pressure to be described later, and may be preset in the control unit 200 (for example, 1.5 bar to 2.0 bar).

When it is determined that the braking hydraulic pressure corresponding to the prefill level has been generated by the master cylinders MC1 and MC2, the control unit 200 may control the inlet valve IV so that the set braking hydraulic pressure that is preset based on the current vehicle speed of the vehicle is supplied to the wheel cylinder WC.

More specifically, an initial braking hydraulic pressure for performing braking of the vehicle based on the regenerative braking deceleration according to the current vehicle speed of the vehicle under driving may be preset in the control unit 200 as the set braking hydraulic pressure. Accordingly, when it is determined that the braking hydraulic pressure corresponding to the prefill level has been generated by the master cylinders MC1 and MC2, the control unit 200 may control the inlet valve IV so that the set braking hydraulic pressure is supplied to the wheel cylinder WC. As described above, the inlet valve IV is a normal open type solenoid valve, and the control unit 200 can allow the set braking hydraulic pressure to be supplied to the wheel cylinder WC by applying a set drive current corresponding to the set braking hydraulic pressure to the inlet valve IV. In addition, since the braking hydraulic pressure corresponding to the prefill level has been generated by the master cylinders MC1 and MC2, the set braking hydraulic pressure can be quickly supplied to the wheel cylinder WC.

Figure 4:
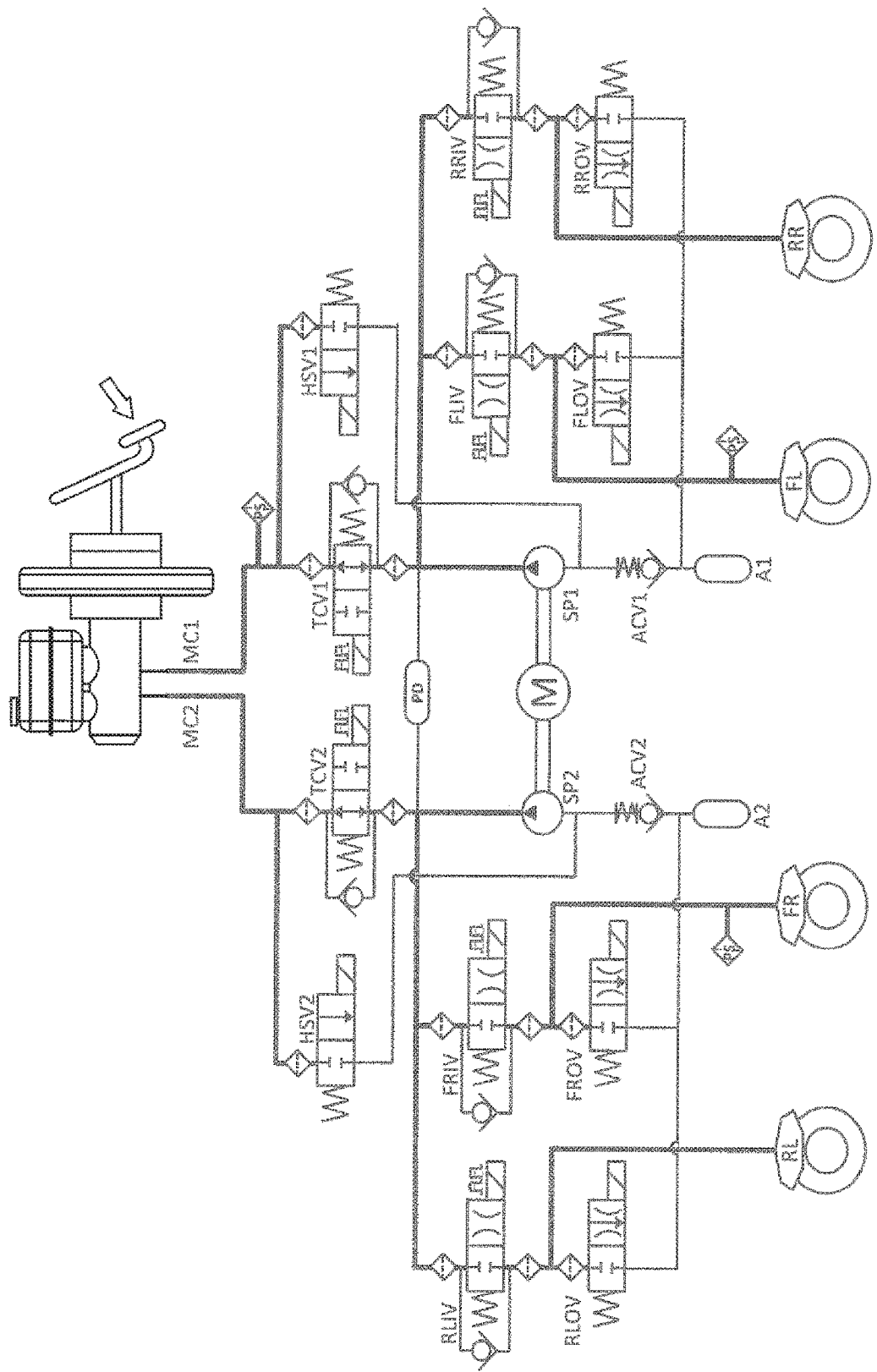

After the first braking period, in the second braking period in which the regenerative braking force increases as the vehicle starts to decelerate and the demand braking force increases, the control unit 200 may control the inlet valve IV so that the state in which the set braking hydraulic pressure is supplied to the wheel cylinder WC is maintained (that is, the control unit 200 may control the inlet valve IV so that the state in which the set drive current is applied to the wheel cylinder WC is maintained and the additional oil pressure is not supplied to the wheel cylinder WC), as shown in FIG. 4. Controlling the inlet valve IV to maintain the state in which the set braking hydraulic pressure is supplied to the wheel cylinder WC in the second braking period may function as a premise to increase the braking hydraulic pressure supplied to the wheel cylinder WC through the third and fourth periods.

Figure 5:
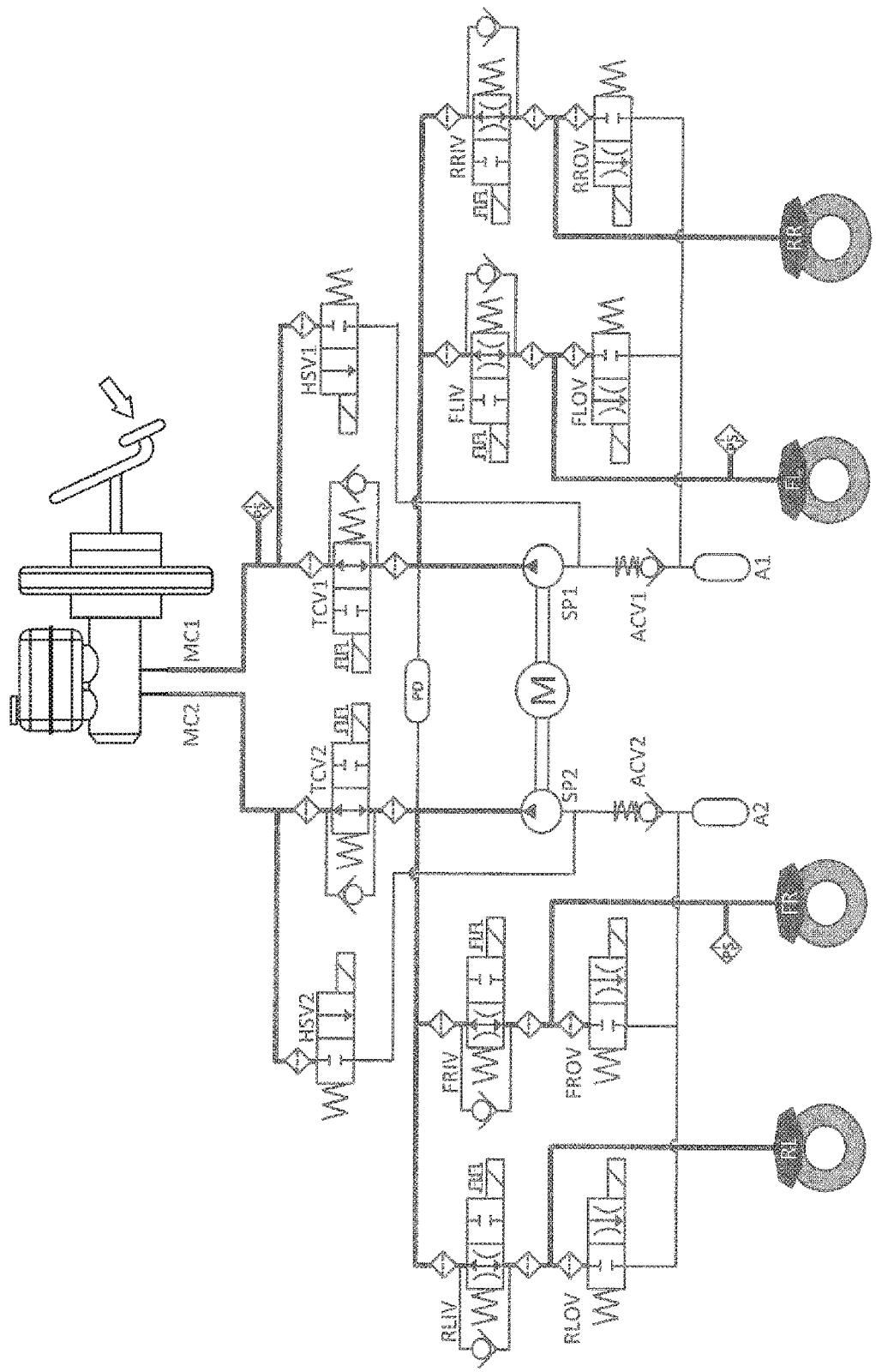

In the third period which enters from the time when the brake pedal is further depressed compared to the first braking period in the state where the second braking period is maintained, the control unit 200 may control the inlet valve IV so that a braking hydraulic pressure equal to or higher than the set braking hydraulic pressure is supplied to the wheel cylinder WC, as shown in FIG. 5.

In other words, when the driver depresses the brake pedal further than in the first braking period, the hydraulic braking force increases as shown in FIG. 2. Accordingly, the control unit 200 may control the inlet valve IV so that the braking hydraulic pressure equal to or higher than the set braking hydraulic pressure maintained until the second braking period is supplied to the wheel cylinder WC.

Figure 6:
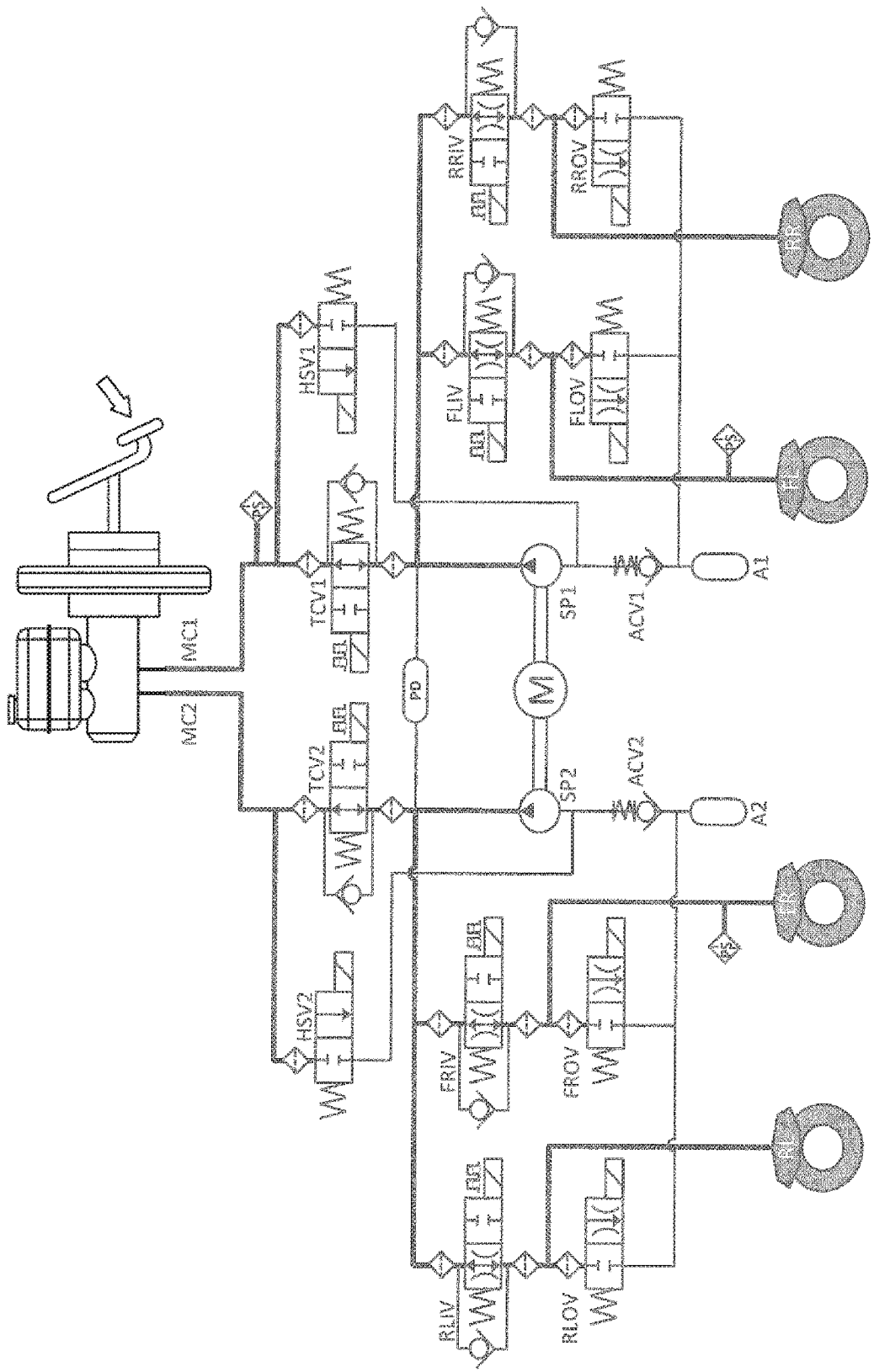

After the third braking period, in the fourth braking period in which the deceleration state of the vehicle is maintained and the regenerative braking force decreases, the control unit 200 may control the inlet valve IV so that the braking hydraulic pressure supplied to the wheel cylinder WC increases, as shown in FIG. 6.

More specifically, it is necessary to increase the hydraulic braking force in order to satisfy the demand braking force requested by the driver, as the regenerative braking force is decreased. To this end, the control unit 200 may control the inlet valve IV so that the braking hydraulic pressure supplied to the wheel cylinder WC increases. At this time, the control unit 200 can linearly decrease the drive current applied to the inlet valve IV, i.e., the normal open type solenoid valve in correspondence with the regenerative braking force and the hydraulic braking force which linearly decrease and increase, respectively, so that the braking hydraulic pressure supplied to the wheel cylinder WC can be increased.

Here, the effect of the present embodiment will be described in terms of the organic operations of the first to fourth braking periods.

In the first to fourth braking periods, the control unit 200 controls the braking hydraulic pressure supplied to the wheel cylinder WC through the control of only the inlet valve IV. That is, after the braking hydraulic pressure corresponding to the prefill level are generated by the master cylinders MC1 and MC2, the control unit 200 controls the inlet valve IV in the first to third braking periods so that the set braking hydraulic pressure is supplied to the wheel cylinders WC and maintained, and the braking hydraulic pressure equal to or higher than the set braking hydraulic pressure is supplied to the wheel cylinder WC when the brake pedal is further depressed. Accordingly, in the fourth braking period in which the regenerative braking force is decreased, the braking hydraulic pressure supplied to the wheel cylinder WC can be controlled to be increased by reducing only the drive current applied to the inlet valve IV based on the braking hydraulic pressure supplied to the wheel cylinder WC up to the third braking period, even if the hydraulic pumps SP1 and SP2 and the hydraulic motor M are not operated to compensate for the decrease in the regenerative braking force. Accordingly, it is possible to eliminate the control operation on the hydraulic apparatuses such as the hydraulic pumps SP1 and SP2 and the hydraulic motor M, thereby eliminating the durability degradation of the hydraulic apparatus due to the operation of the hydraulic pumps SP1 and SP2 and the hydraulic motor, pedal disturbance and noise.

As a specific example, when the outlet valves FLOV, FROV, RLOV and RROV are controlled to move the brake oil to the accumulators A1 and A2 and store in the first to third braking periods and the hydraulic motor M and the hydraulic pumps SP1 and SP2 are operated to forcibly increase the braking hydraulic pressure supplied to the wheel cylinder WC in the fourth braking period in order to increase the braking hydraulic pressure supplied to the wheel cylinder WC in the fourth braking period, there is a problem that the operation of the hydraulic motor M and the hydraulic pumps SP1 and SP2 with an excessive number of times (for example, 1.5 million cycles) is required to forcibly increase the braking hydraulic pressure, thereby degrading the durability of the hydraulic apparatus and generating noise. Also, considering the operations of the hydraulic motor (M) and the hydraulic pumps SP1 and SP2 which are additionally provided for implementing the function of an electronic stability control (ESC), an anti-lock braking system (ABS) and the smart cruise control (SCC) of the vehicle, the problem of durability degradation of the hydraulic apparatus is increased, and there are practical limitations to change the Hard Ware of the hydraulic apparatuses in order to solve these problems.

Therefore, according to the present embodiment, the braking hydraulic pressure supplied to the wheel cylinder WC is controlled by controlling the inlet valve IV in the first to fourth braking periods (i.e., by controlling the drive current applied to the inlet valve IV), so that it is possible to perform the hydraulic braking more effectively in conjunction with the regenerative braking without changing the mechanical design of the hydraulic apparatus or adding new parts while eliminating the problem of durability degradation and noise generation of the hydraulic apparatus.

Figure 7:
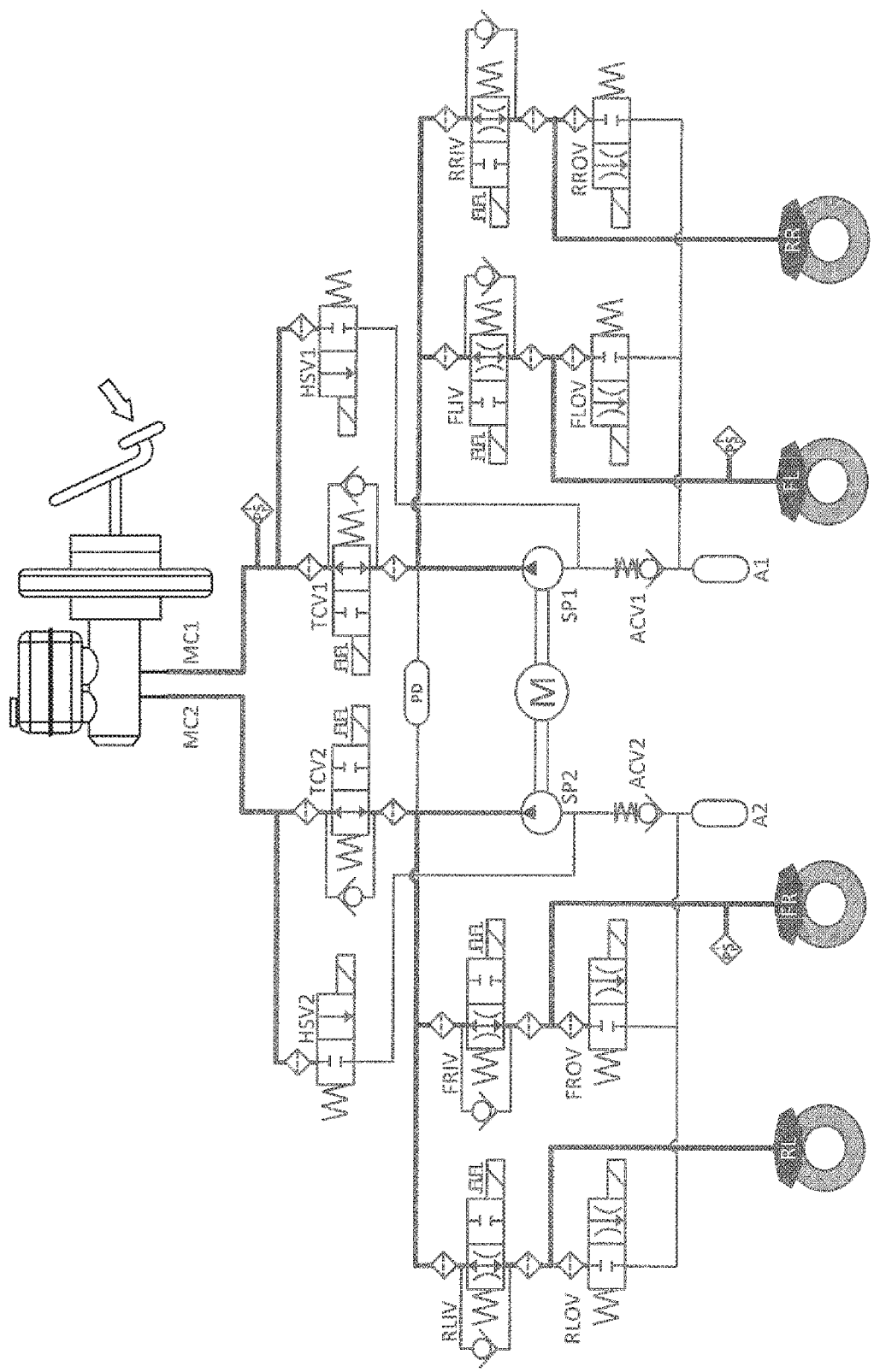

After the fourth braking period, in the fifth braking period in which the vehicle is stopped due to the deceleration of the vehicle, brake pedal is released from depression and the regenerative braking is terminated, the control unit 200 may release the control on the inlet valve IV (that is, release the drive current applied to the inlet valve IV) and switch to the conventional braking system (CBS) mode, as shown in FIG. 7.

Figure 8:
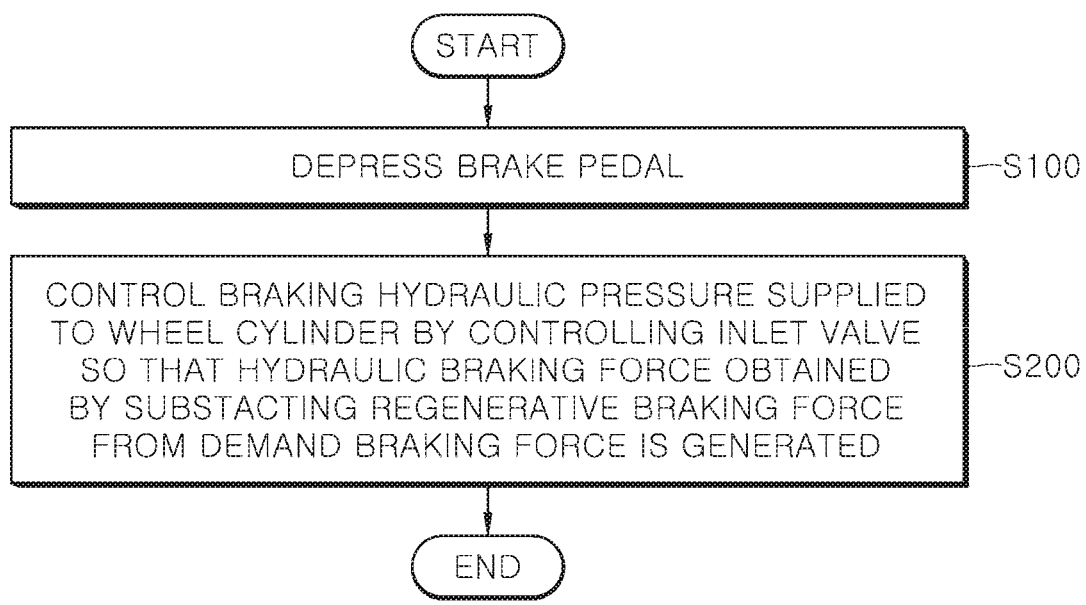
FIG. 8 is a flowchart for explaining a braking control method of a vehicle according to an embodiment of the present disclosure.

FIG. 8 is a flowchart for explaining the braking control method of a vehicle according to an embodiment of the present invention and FIG. 9 is a flowchart for specifically explaining a step of controlling a braking hydraulic pressure in the braking control method of a vehicle according to an embodiment of the present invention.

The braking control method for a vehicle according to an embodiment of the present invention will be described with reference to FIG. 8.

When a driver depresses a brake pedal (S100), a control unit 200 may control the braking hydraulic pressure supplied to a wheel cylinder WC by controlling an inlet valve (IV) so that a hydraulic braking force determined by subtracting a regenerative hydraulic braking force generated by a regenerative braking unit 100 from a demand braking force requested by the driver is generated (S200).

In step S200, the control unit 200 may control the braking hydraulic pressure supplied to the wheel cylinder WC by controlling the inlet valve IV based on the change of the vehicle speed and regenerative braking force of the vehicle. More specifically, the control unit 200 may control the braking hydraulic pressure supplied to the wheel cylinder WC by differentially controlling the inlet valve IV for each of at least one braking period determined based on the vehicle speed and regenerative braking force. In addition, in step S200, the control unit 200 may control the braking hydraulic pressure supplied to the wheel cylinder WC by controlling the drive current applied to the inlet valve IV which is a normal open type solenoid valve.

Hereinafter, the above-described step S200 will be described in detail with reference to FIG. 9. First, in the first braking period in which the regenerative braking force is generated as the brake pedal is depressed and the braking of the vehicle starts in the driving state of the vehicle, the control unit 200 controls the inlet valve IV so that a set braking hydraulic pressure preset based on the current vehicle speed of the vehicle is supplied to the wheel cylinder WC, after the braking hydraulic pressure corresponding to the prefill level is generated by the master cylinder (not shown) as the brake pedal is depressed (S210).

Next, after the first braking period, in the second braking period in which the vehicle starts to decelerate and the regenerative braking force increases as the demand braking force increases, the control unit 200 controls the inlet valve IV so that the state in which the set braking hydraulic pressure is supplied to the wheel cylinder WC is maintained (S230).

Next, in the third braking period which enters from the time when the brake pedal is further depressed compared to the first braking period in the state where the second braking period is maintained, the control unit 200 controls the inlet valve IV so that the braking hydraulic pressure equal to or higher than the set braking hydraulic pressure is supplied to the wheel cylinder WC (S250).

Next, after the third braking period, in the fourth braking period in which the deceleration state of the vehicle is maintained and the regenerative braking force decreases, the control unit 200 controls the inlet valve IV so that the braking hydraulic pressure supplied to the wheel cylinder WC is increased (S270).

Next, after the fourth braking period, in the fifth braking period in which a time point at which the vehicle is stopped due to the deceleration of the vehicle and the depression of the brake pedal is released is included and the regenerative braking is terminated, the control unit 200 releases the control on the inlet valve IV and switches to the conventional braking system (CBS) mode (S290).

As described above, according to the present embodiment, the braking for the vehicle is performed in connection with the regenerative braking only through the control on the inlet valve of the hydraulic apparatus, thereby eliminating durability degradation, pedal disturbance and noise due to the operation of the hydraulic apparatus, particularly the hydraulic pumps and the hydraulic motor. In addition, it is not required to change the mechanical design or add new parts, so that the braking system of the vehicle can be simplified, the cost can be reduced, and the mass productivity can be improved.

Although preferred embodiments of the invention have been disclosed for illustrative purposes, those skilled in the art will appreciate that various modifications, additions and substitutions are possible, without departing from the scope and spirit of the invention as defined in the accompanying claims.

Accordingly, the true technical scope of the present invention should be determined by the following claims.

What is claimed is:

1. A braking apparatus for a vehicle, comprising:
    an inlet valve configured to interrupt a braking hydraulic pressure supplied to a wheel cylinder of the vehicle;
    a regenerative braking unit configured to perform a regenerative braking of the vehicle; and
    a control unit configured to control the braking hydraulic pressure supplied to the wheel cylinder by controlling the inlet valve so that a hydraulic braking force determined by subtracting a regenerative braking force from a demand braking force is generated, wherein the regenerative braking force is generated by the regenerative braking unit and the demand braking force is requested by a driver,
    wherein the control unit is configured to control the hydraulic braking pressure supplied to the wheel cylinder by controlling the inlet valve based on changes in a vehicle speed and the regenerative braking force of the vehicle,
    wherein the control unit is configured to control only the inlet valve so that the hydraulic braking pressure supplied to the wheel cylinder is maintained equal or greater than a set braking hydraulic pressure preset, as a preliminary control operation for increasing the hydraulic braking pressure supplied to the wheel cylinder by controlling only the inlet valve to compensate for the decrease of the regenerative braking force.

2. The braking apparatus of claim 1, wherein the control unit is configured to control the braking hydraulic pressure supplied to the wheel cylinder by differentially controlling the inlet valve for each of at least one braking period determined based on the vehicle speed and the regenerative braking force.

3. The braking apparatus of claim 2, wherein in a first braking period in which the regenerative braking force is generated as a brake pedal is depressed in a driving state of the vehicle and a braking of the vehicle starts, the control unit is configured to control the inlet valve so that the set braking hydraulic pressure preset based on a current vehicle speed of the vehicle is supplied to the wheel cylinder, after the braking hydraulic pressure corresponding to a prefill level is generated by a master cylinder as the brake pedal is depressed.

4. The braking apparatus of claim 3, wherein in a second braking period which occurs after the first braking period ends and in which the vehicle starts to decelerate and the regenerative braking force increases as the demand braking force increases, the control unit is configured to control the inlet valve so that a state in which the set braking hydraulic pressure is supplied to the wheel cylinder is maintained.

5. The braking apparatus of claim 4, wherein in a third braking period which occurs after the second braking period ends and which starts from a time when the brake pedal is further depressed compared to the first braking period in a state where the second braking period is maintained, the control unit is configured to control the inlet valve so that the braking hydraulic pressure equal to or higher than the set braking hydraulic pressure is supplied to the wheel cylinder.

6. The braking apparatus of claim 5, wherein, in a fourth braking period which occurs after the third braking period ends and in which a deceleration state of the vehicle is maintained and the regenerative braking force decreases, the control unit is configured to control the inlet valve so that the braking hydraulic pressure supplied to the wheel cylinder is increased by reducing a drive current applied to the inlet valve based on the braking hydraulic pressure supplied to the wheel cylinder during the first, second, and third braking periods.

7. The braking apparatus of claim 1,
wherein the inlet valve is a normal open type solenoid valve.

8. A braking control method for a vehicle, which comprises an inlet valve configured to interrupt a braking hydraulic pressure supplied to a wheel cylinder of the vehicle and a regenerative braking unit configured to perform a regenerative braking of the vehicle, the braking control method comprising the steps of:
controlling, by a control unit, the braking hydraulic pressure supplied to the wheel cylinder by controlling the inlet valve so that a hydraulic braking force determined by subtracting a regenerative braking force generated by the regenerative braking unit from a demand braking force requested by a driver is generated,
wherein the control unit is configured to control the hydraulic braking pressure supplied to the wheel cylinder by controlling the inlet valve based on changes in a vehicle speed and the regenerative braking force of the vehicle, and
wherein in the step of controlling the braking hydraulic pressure, the control unit controls only the inlet valve so that the hydraulic braking pressure supplied to the wheel cylinder is maintained equal or greater than a set braking hydraulic pressure preset, as a preliminary control operation for increasing the hydraulic braking pressure supplied to the wheel cylinder by controlling only the inlet valve to compensate for the decrease of the regenerative braking force.

9. The braking control method of claim 8, wherein in the step of controlling the braking hydraulic pressure, the control unit is configured to control the braking hydraulic pressure supplied to the wheel cylinder by differentially controlling the inlet valve for each of at least one braking period determined based on the vehicle speed and the regenerative braking force.

10. The braking control method of claim 9, wherein the step of controlling the braking hydraulic pressure comprises:
controlling, by the control unit, the inlet valve so that the set braking hydraulic pressure preset based on a current vehicle speed of the vehicle is supplied to the wheel cylinder, after the braking hydraulic pressure corresponding to a prefill level is generated by a master cylinder as a brake pedal is depressed in a first braking period in which the regenerative braking force is generated as the brake pedal is depressed in a driving state of the vehicle and a braking of the vehicle starts.

11. The braking control method of claim 10, wherein the controlling the braking hydraulic pressure comprises:
controlling, by the control unit, the inlet valve so that a state in which the set braking hydraulic pressure is supplied to the wheel cylinder is maintained in a second braking period which occurs after the first braking period ends in which the vehicle starts to decelerate, and the regenerative braking force increases as the demand braking force increases, after the first braking period.

12. The braking control method of claim 11, wherein the step of controlling the braking hydraulic pressure comprises:
controlling, by the control unit, the inlet valve so that a braking hydraulic pressure equal to or higher than the set braking hydraulic pressure is supplied to the wheel cylinder, in a third braking period which occurs after the second braking period ends and which starts from a time when the brake pedal is further depressed compared to the first braking period in a state where the second braking period is maintained.

13. The braking control method of claim 12, wherein the controlling the braking hydraulic pressure comprises:
controlling, by the control unit, the inlet valve so that the braking hydraulic pressure supplied to the wheel cylinder increases in a fourth braking period which occurs after the third braking period ends in which a deceleration state of the vehicle is maintained and the regenerative braking force decreases, by reducing a drive current applied to the inlet valve based on the braking hydraulic pressure supplied to the wheel cylinder during the first, second, and third braking periods.

14. The braking control method of claim 8,
wherein the inlet valve is a normal open type solenoid valve.

* * * * *